US012705848B2

(12) United States Patent
Wang et al.

(10) Patent No.: US 12,705,848 B2
(45) Date of Patent: Aug. 11, 2026

(54) METHOD AND APPARATUS FOR STYLIZING THREE-DIMENSIONAL MODEL, ELECTRONIC DEVICE, AND STORAGE MEDIUM

(71) Applicant: Beijing Zitiao Network Technology Co., Ltd., Beijing (CN)

(72) Inventors: Guangwei Wang, Beijing (CN); Xiaodong Song, Beijing (CN); Min Xie, Beijing (CN); Jiaxin Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 18/692,224

(22) PCT Filed: Aug. 24, 2022

(86) PCT No.: PCT/CN2022/114398
§ 371 (c)(1),
(2) Date: Mar. 14, 2024

(87) PCT Pub. No.: WO2023/040609
PCT Pub. Date: Mar. 23, 2023

(65) Prior Publication Data

US 2024/0378837 A1 Nov. 14, 2024

(30) Foreign Application Priority Data

Sep. 14, 2021 (CN) ......................... 202111074530.7

(51) Int. Cl.
*G06T 19/20* (2011.01)
*G06T 15/04* (2011.01)
*G06T 15/20* (2011.01)

(52) U.S. Cl.
CPC .............. *G06T 19/20* (2013.01); *G06T 15/04* (2013.01); *G06T 15/20* (2013.01); *G06T 2219/2024* (2013.01)

(58) Field of Classification Search
CPC ......... G06T 19/20; G06T 15/04; G06T 15/20; G06T 2219/2024
See application file for complete search history.

(56) References Cited

U.S. PATENT DOCUMENTS 11,037,359 B1 6/2021 Bleyer et al.
2015/0112970 A1* 4/2015 Hirai .................. G06F 16/5854 707/722

(Continued)

FOREIGN PATENT DOCUMENTS

CN 109147025 A 1/2019
CN 109255831 A 1/2019

(Continued)

OTHER PUBLICATIONS

International Search Report in PCT/CN2022/114398, mailed Oct. 26, 2022, 3 pages.

(Continued)

*Primary Examiner* — Xin Sheng
(74) *Attorney, Agent, or Firm* — Astute IP Law Group

(57) ABSTRACT

The disclosure discloses a method and an apparatus for stylizing a three-dimensional model, an electronic device, and a storage medium. The method for stylizing the three-dimensional model includes: acquiring a to-be-stylized three-dimensional model and a stylized target image; and rendering the three-dimensional model by using a predetermined network to acquire a two-dimensional rendered image and spatial feature parameters of a pixel, and stylizing a texture feature in the two-dimensional rendered image based (Continued)

ACQUIRE A TO-BE-STYLIZED THREE-DIMENSIONAL MODEL AND A STYLIZED TARGET IMAGE ~S210

DETERMINE A PLURALITY OF VIEWING ANGLES WHOSE FIELD-OF-VIEW RANGES ARE CAPABLE OF COVERING THE THREE-DIMENSIONAL MODEL ~S220

RENDER THE THREE-DIMENSIONAL MODEL FROM A CURRENT VIEWING ANGLE BY USING A RENDERER TO ACQUIRE A TWO-DIMENSIONAL RENDERED IMAGE CORRESPONDING TO THE CURRENT VIEWING ANGLE AND SPATIAL FEATURE PARAMETERS OF A PIXEL CORRESPONDING TO THE CURRENT VIEWING ANGLE ~S230

STYLIZE A TEXTURE FEATURE IN THE TWO-DIMENSIONAL RENDERED IMAGE CORRESPONDING TO THE CURRENT VIEWING ANGLE BY USING A STYLIZING NETWORK BASED ON THE SPATIAL FEATURE PARAMETERS OF THE PIXEL CORRESPONDING TO THE CURRENT VIEWING ANGLE AND THE STYLIZED TARGET IMAGE ~S240

IS THE THREE-DIMENSIONAL MODEL STYLIZED INTEGRALLY? ~S250

NO

SELECT A NEXT VIEWING ANGLE AS A CURRENT VIEWING ANGLE ~S260

YES

OUTPUT A COMPLETE STYLIZED THREE-DIMENSIONAL MODEL ~S270 on the spatial feature parameters and the stylized target image to acquire a stylized three-dimensional model.

17 Claims, 4 Drawing Sheets

(56) References Cited

U.S. PATENT DOCUMENTS

| | | | | |
|---|---|---|---|---|
| 2019/0228587 | A1* | 7/2019 | Mordvintsev | G06T 19/20 |
| 2021/0110588 | A1 | 4/2021 | Adamson, III | |

FOREIGN PATENT DOCUMENTS

| | | | | | |
|---|---|---|---|---|---|
| CN | 110084874 | A | | 8/2019 | |
| CN | 110176072 | A | | 8/2019 | |
| CN | 110533579 | A | | 12/2019 | |
| CN | 111932673 | A | * | 11/2020 | G06T 15/005 |
| CN | 111951345 | A | | 11/2020 | |
| WO | 2021178079 | A1 | | 9/2021 | |

OTHER PUBLICATIONS

Minglei Li, "Image Processing and Visual Measurement", 1st Edition, Library of Congress CIP Data, China Atomic Energy Press, Nov. 2019, 8 pages.

Office Action for Chinese Patent Application No. 202111074530.7, mailed on Feb. 14, 2026, 17 pages.

Xu et al., "Frame Difference-Based Temporal Loss for Video Stylization", arXiv:2102.05822v1 [cs.CV], Feb. 11, 2021, 11 pages.

* cited by examiner

METHOD AND APPARATUS FOR STYLIZING THREE-DIMENSIONAL MODEL, ELECTRONIC DEVICE, AND STORAGE MEDIUM

This is a national stage application based on International Patent Application No. PCT/CN2022/114398, filed Aug. 24, 2022, which claims priority to Chinese Patent Application No. 202111074530.7, filed to the China National Intellectual Property Administration on Sep. 14, 2021, the disclosures of which are incorporated herein by reference in their entireties.

FIELD

The present disclosure relates to the field of image processing technologies, for example, a method and an apparatus for stylizing a three-dimensional model, an electronic device, and a storage medium.

BACKGROUND

Stylization, also referred to as style transfer, may transfer a style of an image having an artistic feature to a common two-dimensional image, so that the two-dimensional image has a unique artistic style, for example, cartoon, caricature, oil painting, watercolor, or ink painting while retaining original content. Stylization of a two-dimensional image can be implemented by using a deep learning network. However, if a style of a target image needs to be transferred to a three-dimensional model, because the three-dimensional model is three-dimensional, but the target image is two-dimensional, processing cannot be implemented by using three-dimensional convolution. There is no effective solution for stylization of a three-dimensional model.

SUMMARY

The present disclosure provides a method and an apparatus for stylizing a three-dimensional model, an electronic device, and a storage medium, in order to implement stylization of a three-dimensional model.

The present disclosure provides a method for stylizing a three-dimensional model, comprising:

acquiring a to-be-stylized three-dimensional model and a stylized target image; and rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model.

The present disclosure also provides a method for stylizing a three-dimensional model, comprising:

scanning at least two two-dimensional input images, wherein each two-dimensional input image comprises a feature of a to-be-modeled target in a corresponding viewing angle;

establishing a three-dimensional model of the to-be-modeled target based on the at least two two-dimensional input images; and stylizing the three-dimensional model based on a predetermined network, a stylized target image, and spatial feature parameters of a pixel in the three-dimensional model.

The present disclosure also provides an apparatus for stylizing a three-dimensional model, comprising:

an acquiring module, configured to acquire a to-be-stylized three-dimensional model and a stylized target image; and a stylizing module, configured to: render the three-dimensional model by using a predetermined network to acquire a two-dimensional rendered image and spatial feature parameters of a pixel, and stylize a texture feature in the two-dimensional rendered image based on the spatial feature parameters and the stylized target image to acquire a stylized three-dimensional model.

The present disclosure also provides an apparatus for stylizing a three-dimensional model, comprising:

a scanning module, configured to scan at least two two-dimensional input images, wherein each two-dimensional input image comprises a feature of a to-be-modeled target in a corresponding viewing angle;

a modeling module, configured to establish a three-dimensional model of the to-be-modeled target based on the at least two two-dimensional input images; and a performing module, configured to stylize the three-dimensional model based on a predetermined network, a stylized target image, and spatial feature parameters of a pixel in the three-dimensional model.

The present disclosure also provides an electronic device, comprising:

at least one processor;

a storage device, configured to store at least one program, wherein the at least one program, when executed by the at least one processor, causes the at least one processor to implement the above method for stylizing the three-dimensional model.

The present disclosure also provides a computer-readable storage medium, configured to store a computer program, wherein the program, when executed by a processor, implements the above method for stylizing the three-dimensional model.

DETAILED DESCRIPTION

Figure 1:
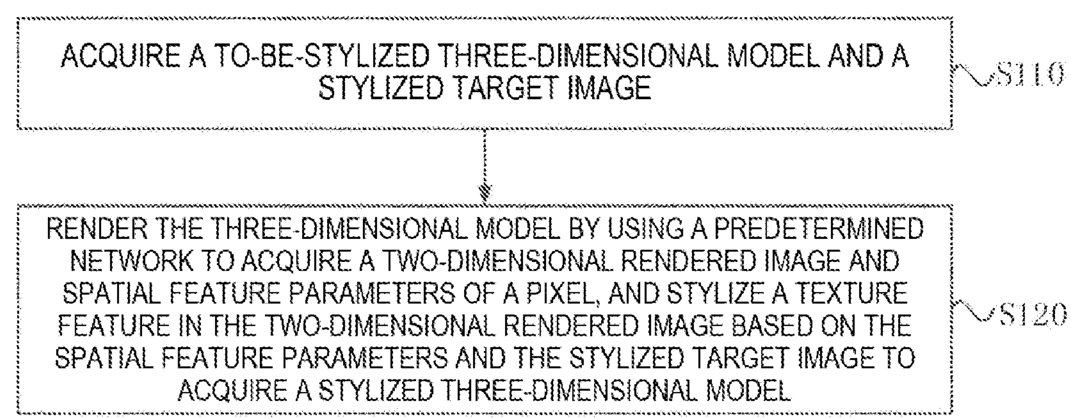
FIG. 1 is a flowchart of a method for stylizing a three-dimensional model according to Embodiment 1 of the present disclosure.

The following will describe the examples of the present disclosure with reference to the accompanying drawings.

Although some examples of the present disclosure are shown in the drawings, the disclosure can be implemented in various forms, and should not be construed as limited to the embodiments set forth herein. The drawings and examples of the disclosure are for illustrative purposes only.

It should be understood that the steps described in the method embodiments of the present disclosure may be performed in a different order and/or in parallel. Furthermore, the method embodiments may include additional steps and/or omit performing the illustrated steps. The scope of the present disclosure is not limited in this regard.

As used herein, the term "include" and its variants should be construed as open terms meaning "including, but not limited to". The term "based on" means "at least partially based on". The term "one embodiment" means "at least one embodiment". The term "another embodiment" means "at least one another embodiment". The terms "some embodiments" means "at least some embodiments". Related definitions of other terms will be given in the following descriptions.

It should be noted that the concepts of "first", "second" and the like mentioned in the present disclosure are used only to distinguish different apparatuses, modules or units but not to limit the order or interdependence of the functions performed by these apparatuses, modules or units.

Names of messages or information interacted among multiple apparatuses in the embodiments of the present disclosure are used for illustrative purposes only but are not intended to limit the scope of these messages or information.

In the following embodiments, both optional features and examples are provided in each embodiment, the individual features described in the embodiments may be combined to form a plurality of optional solutions, and each numbered embodiment should not be considered as only one technical solution.

Embodiment 1

FIG. 1 is a flowchart of a method for stylizing a three-dimensional model according to Embodiment 1 of the present disclosure. The method may be applicable to stylizing a three-dimensional model. For example, the method may include: inputting the three-dimensional model into a predetermined network, and performing all-round stylization on the three-dimensional model through the predetermined network based on a style of a stylized target image, thereby outputting a stylized three-dimensional model whose structure is the same as that of the original three-dimensional model. The method may be performed by an apparatus for stylizing a three-dimensional model. The apparatus may be implemented by software and/or hardware, and is integrated in an electronic device. The electronic device in this embodiment may be, for example, a computer, a notebook computer, a server, a tablet computer, a smartphone, or another device that has an image processing function.

A process of stylizing a three-dimensional model may be: stylizing a texture on a surface of the three-dimensional model. In this process, a two-dimensional image containing a texture feature needs to be drawn based on the three-dimensional model. In this process, the following problems need to be solved: in the course of drawing a two-dimensional image from a portion that is of a surface of a three-dimensional model and is visible from a viewing angle, it is necessary to determine a projection plane. However, included angles between the projection plane and some positions in the visible portion are too large. After these positions are projected on the projection plane and are stylized, there is a large deformation compared with the original three-dimensional model. Because the three-dimensional model is stereoscopic, it is impossible to draw all textures of the three-dimensional model onto the two-dimensional image at a time. However, if drawing is performed a plurality of times, the continuity of stylization effects of texture features that are of the two-dimensional image and are drawn at different times is poor. In addition, because the three-dimensional model is stereoscopic and complex in shape, positions at different depths in a viewing angle may be shielded. As a result, actual positions of adjacent pixels projected on the two-dimensional image may not be adjacent on the three-dimensional model, and texture features of the adjacent pixels are not necessarily continuous and are difficult to process during stylization. For example, when looking at the head of a person, a user can see the lowest point on the chin of the person, and then can see a point on the neck of the person below the chin. When viewed from the front, the two points are adjacent. But in fact, the depths of the two points are different, resulting in discontinuous texture features of the two points. During stylization, the user needs to take a difference between the texture features of the two points into consideration to still reflect the different depths of the two points after the stylization.

As shown in FIG. 1, Embodiment 1 of the present disclosure provides a method for stylizing a three-dimensional model. The method includes the following steps.

In S110, acquiring a to-be-stylized three-dimensional model and a stylized target image.

In this embodiment, a to-be-stylized three-dimensional model may be any stereoscopic model, for example, a three-dimensional geometric model, a model generated based on an entity (for example, a model established based on a table), a model generated based on a plurality of two-dimensional images (for example, a model established based on photos of a table that are taken from different angles), a virtual model (for example, a table model synthesized by software), and so on. An object represented by the three-dimensional model may be an entity in the real world or a fictional object.

A stylized target image is two-dimensional and may be a reference image having a specific artistic style. The purpose of stylizing the three-dimensional model is mainly to transfer the specific artistic style in the stylized target image to a surface of the three-dimensional model, so that the surface of the three-dimensional model has a corresponding texture rule, color rule, visual feeling, or the like. The stylized target images may be downloaded from a network image library, or may be inputted or specified by a user.

In S120, rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model.

In this embodiment, the predetermined network is mainly a deep neural network with the following two functions: drawing a two-dimensional rendered image having a texture feature from a three-dimensional model; and stylizing the texture feature in the two-dimensional rendered image and reflecting the stylized texture feature at a corresponding position on a surface of the three-dimensional model. A to-be-stylized three-dimensional model and a stylized target image are inputted to the predetermined network. The three-dimensional model provides a content feature, the stylized target image provides a style feature, and a stylized three-dimensional model is acquired and outputted by combining the content feature with the style feature.

Spatial feature parameters may include an included angle between a normal direction and a sight line that correspond to each pixel, a depth of the pixel, and the like, and are configured to determine a correspondence between a pixel in the two-dimensional rendered image and a pixel on a surface of the three-dimensional model, thereby stylizing the texture feature in the two-dimensional rendered image on the surface of the three-dimensional model.

A drawing process may be implemented by using a renderer, and a stylizing process may be implemented by using a stylizing network. First, the predetermined network renders the three-dimensional model by using the renderer to draw the three-dimensional model on the projection plane and acquire the two-dimensional rendered image. In this process, the renderer may also calculate the spatial feature parameters of a pixel. Then, the two-dimensional rendered image passes through the stylizing network. In the stylizing network, the correspondence between the pixel in the two-dimensional rendered image and the pixel on the surface of the three-dimensional model may be determined based on the spatial feature parameters. Therefore, the texture feature of the corresponding pixel on the surface of the three-dimensional model may be stylized by using the style of the stylized target image, that is, style transfer may be implemented. Based on this, the entire three-dimensional model may be stylized step by step by performing rendering a plurality of times in different viewing angles.

The stylizing process may be implemented by using a neural network having an encoder-decoder structure. The encoder is configured to: receive the two-dimensional rendered image and stylized target image that are inputted, and extract feature vectors of the two-dimensional rendered image and the stylized target image. These feature vectors may be another representation of a feature and information that are inputted. The decoder is configured to output an expected result based on these feature vectors. The expected result is a three-dimensional model obtained in response to transferring the style of the stylized target image to the surface of the three-dimensional model corresponding to the two-dimensional rendered image.

The renderer may be a differentiable renderer. After being trained, the differentiable renderer may learn a rule of obtaining a two-dimensional rendered image from a three-dimensional model.

The stylizing network may be an image segmentation network, for example, U-net. U-net uses a network structure that includes downsampling and upsampling. The main purpose of downsampling is to gradually present texture rules of each pixel and surrounding pixels based on an image feature (which may also be a style feature) of the stylized target image. The main purpose of upsampling is to restore details of the three-dimensional model with reference to downsampled information and the features of the original three-dimensional model (namely, the to-be-stylized three-dimensional model), and gradually restore a resolution to the level of the original three-dimensional model.

According to the method for stylizing the three-dimensional model provided in this embodiment, the three-dimensional model is rendered into a two-dimensional image, and a spatial feature and a spatial position relationship of each pixel in the three-dimensional model may be defined by using the spatial feature parameters of the pixel, so that the three problems mentioned above can be solved. This can reduce the deformation during stylization, take the influence of discontinuity of the texture features of adjacent pixels on stylization into consideration, and ensure the effectiveness of the three-dimensional model in all-round stylization. Based on this, all pixels in the two-dimensional rendered image, including adjacent pixels whose texture features are discontinuous, are stylized, while the conformity in spatial structures of the three-dimensional model before and after stylization can be ensured.

Embodiment 2

Figure 2:
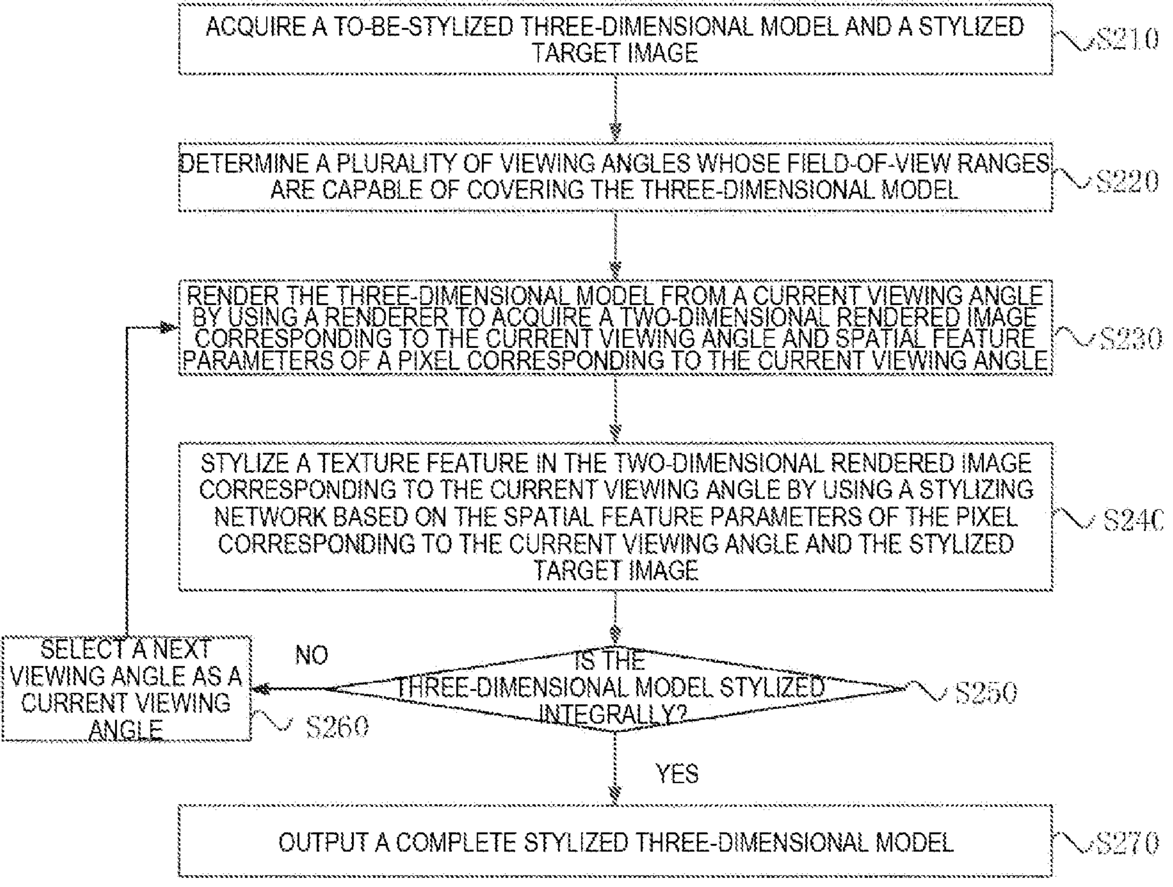
FIG. 2 is a flowchart of a method for stylizing a three-dimensional model according to Embodiment 2 of the present disclosure.

FIG. 2 is a flowchart of a method for stylizing a three-dimensional model according to Embodiment 2 of the present disclosure. In Embodiment 2, processes of rendering and stylizing a three-dimensional model by using a predetermined network are described on the basis of the foregoing embodiment.

In this embodiment, the three-dimensional model is rendered by using the predetermined network to acquire a two-dimensional rendered image and spatial feature parameters of a pixel, and a texture feature in the two-dimensional rendered image is stylized based on the spatial feature parameters and a stylized target image to acquire a stylized three-dimensional model. This method includes: determining a plurality of viewing angles whose field-of-view ranges can cover the three-dimensional model; rendering the three-dimensional model from a current viewing angle by using the predetermined network to acquire a two-dimensional rendered image corresponding to the current viewing angle and spatial feature parameters of a pixel corresponding to the current viewing angle, and stylizing the texture feature in the two-dimensional rendered image corresponding to the current viewing angle based on the spatial feature parameters of the pixel corresponding to the current viewing angle and the stylized target image; and continuing to select a next viewing angle as a current viewing angle, and repeatedly performing a rendering operation and a stylizing operation from the current viewing angle until a complete stylized three-dimensional model is acquired. Based on this, a task of stylizing the three-dimensional model is decomposed into a plurality of serial processes from a plurality of viewing angles. Rendering and stylizing in each viewing angle are performed based on rendering and stylizing in a previous viewing angle. Therefore, the overall stylization of the three-dimensional model is completed gradually. This ensures the continuity of the stylized three-dimensional model and ensures the conformity in spatial structures of the three-dimensional model before and after stylization.

In this embodiment, the predetermined network includes a renderer and a stylizing network. The spatial feature parameters of the pixel corresponding to the current viewing angle include an included angle between a normal direction and a sight line that correspond to the pixel corresponding to the current viewing angle, as well as a depth of the pixel corresponding to the current viewing angle. If the current viewing angle is not a first viewing angle, the spatial feature parameter of the pixel corresponding to the current viewing angle further includes a mask of a portion that is in the two-dimensional rendered image corresponding to the current viewing angle and is already stylized in the previous viewing angle. In other words, for a non-first viewing angle, an input of the renderer is a partially stylized three-dimensional model that is outputted in a previous viewing angle. A spatial position relationship of each pixel in the three-dimensional model may be defined based on the spatial feature parameters of the pixel corresponding to the current viewing angle. Therefore, all pixels in the two-dimensional rendered image, including adjacent pixels whose texture features are discontinuous, are effectively stylized.

If a world coordinate system is used to position a plurality of pixels on the surface of the three-dimensional model, projection planes in different viewing angles are fixed. Therefore, normal directions corresponding to the plurality of pixels are changeless. However, in processes of rendering and stylizing, sight lines from a human eye and a camera to each pixel are different. If a camera coordinate system is used to position a plurality of pixels on the surface of the three-dimensional model, a sight line to any pixel may be used as a baseline. In other words, when a user looks at a pixel, this pixel may be moved to a fixation point of a sight line. In this case, the three-dimensional model and its projection plane are usually rotated, so that when the user looks at different pixels, corresponding normal directions are different. No matter which one of the foregoing coordinate systems is used, when the three-dimensional model is rendered and stylized from the current viewing angle, an included angle between a normal direction and a sight line that correspond to each pixel is definite. This embodiment is described by using the world coordinate system as an example.

As shown in FIG. 2, Embodiment 2 of the present disclosure provides a method for stylizing a three-dimensional model. The method includes the following steps:

In S210, acquiring a to-be-stylized three-dimensional model and a stylized target image.

In S220, determining a plurality of viewing angles whose field-of-view ranges cover the three-dimensional model.

On the basis that the three-dimensional model is drawn on the projection plane, a viewing angle may be an included angle between a sight line to a pixel and a direction perpendicular to the projection plane. The direction perpendicular to the projection plane is a normal direction. A field-of-view range may be a range that an eye or a camera can capture while looking at the three-dimensional model from a viewing angle. To ensure all-round stylization of the three-dimensional model, the field-of-view ranges of a plurality of viewing angles need to cover all positions on the surface of the three-dimensional model.

Figure 3:
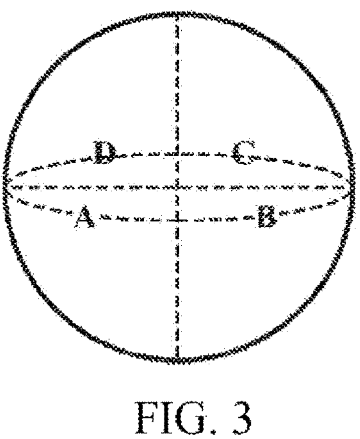
FIG. 3 is a schematic diagram of a sphere model viewed in a plurality of viewing angles according to Embodiment 2 of the present disclosure.

FIG. 3 is a schematic diagram of a sphere model viewed in a plurality of viewing angles according to Embodiment 2 of the present disclosure. As shown in FIG. 3, the three-dimensional model is a sphere model. Half of the surface of the sphere model can be seen from a front viewing angle. This half is divided into a left portion and a right portion. Each of the portions is actually ¼ of the surface of the sphere model. The two portions are denoted as A and B, respectively. B and a portion that is invisible from the front viewing angle can be seen from a right viewing angle. This portion is also ¼ of the surface of the sphere model, and is denoted as C. C and a portion that is invisible from both the front viewing angle and the right viewing angle can be seen from a rear viewing angle. This portion is also ¼ of the surface of the sphere model, and is denoted as D. D and A can be seen from a left viewing angle. The field-of-view ranges of the four viewing angles can cover all positions on the surface of the three-dimensional model.

In S230, a renderer renders the three-dimensional model from a current viewing angle to acquire a two-dimensional rendered image corresponding to the current viewing angle and spatial feature parameters of a pixel corresponding to the current viewing angle.

For the current viewing angle, the corresponding two-dimensional rendered image acquired by rendering the three-dimensional model by using the renderer contains a texture feature that is on the surface of the three-dimensional model and is visible from the current viewing angle. The spatial feature parameters of each pixel in the two-dimensional rendered image may also be calculated by using the renderer. The spatial feature parameters of each pixel may include an included angle between a sight line to the pixel from the current viewing angle and a normal direction under the current viewing angle, as well as a depth of each pixel under the current viewing angle. The depth may be a distance between the pixel and an eye or a camera, or a distance between the pixel and the projection plane. The depth may reflect the position of the pixel in the sight line.

For each of other viewing angles other than the first viewing angle, the spatial feature parameters of the pixel corresponding to this viewing angle further includes a mask of a portion that is in the two-dimensional rendered image corresponding to this viewing angle and is already stylized in a previous viewing angle. This mask is configured to distinguish between a portion that has been stylized and a portion that has not been stylized, so that the stylizing network stylizes the portion that has not been stylized.

In S240, a texture feature in the two-dimensional rendered image corresponding to the current viewing angle is stylized through the stylizing network based on the spatial feature parameters of the pixel corresponding to the current viewing angle and the stylized target image.

Field-of-view ranges of adjacent viewing angles are overlapped. Stylizing the texture feature in the two-dimensional rendered image corresponding to the current viewing angle includes: stylizing a texture feature of a portion that is in the two-dimensional rendered image corresponding to the current viewing angle but does not appear in a two-dimensional rendered image corresponding to a previous viewing angle, wherein the previous viewing angle is a viewing angle from which the rendering operation and the stylizing operation have been performed.

With reference to the sphere model shown in FIG. 3, the field-of-view range of the front viewing angle is overlapped with that of the right viewing angle, the field-of-view range of the right viewing angle is overlapped with that of the rear viewing angle, and the left viewing angle is not taken into consideration. In addition, for the junction of D and A, the following may be performed to ensure the continuity of stylizing by using a spatial feature: the field-of-view range of the rear viewing angle is moved to be overlapped with that of the front viewing angle, that is, D is moved to be overlapped with A. This can be implemented by rotating the rear viewing angle to the front viewing angle counterclockwise by a specific angle. Based on this, if the current viewing angle is the front viewing angle, A and B are rendered to acquire a two-dimensional rendered image, and a texture feature in the two-dimensional rendered image is stylized. Then, the current viewing angle is the right viewing angle, B and C are rendered to acquire a two-dimensional rendered image, and a texture feature in the two-dimensional rendered image is stylized, wherein B has been rendered and stylized in the front viewing angle, so that only C needs to be stylized based on a spatial relationship between B and C. Subsequently, the current viewing angle is the rear viewing angle, C and D (D includes a portion overlapped with A) are rendered to acquire a two-dimensional rendered image, and a texture feature in the two-dimensional rendered image is stylized, wherein C has been rendered and stylized in the right viewing angle, and a portion by which Dis overlapped with A has been stylized in the front viewing angle, so that only a portion that is of D and is not overlapped with A needs to be stylized. Based on this, repeatedly stylizing the same portion can be avoided, so that the stylizing efficiency is improved.

In S250, whether the three-dimensional model is stylized integrally is determined; S270 is performed if the three-dimensional model is stylized integrally; and S260 is performed if the three-dimensional model is not stylized integrally.

In this embodiment, determining whether the three-dimensional model is stylized integrally may be replaced with determining whether the current viewing angle is a last viewing angle. If the current viewing angle is the last viewing angle, it indicates that the three-dimensional model is stylized completely. In this case, an output of the stylizing network is a stylized model. If the current viewing angle is not the last viewing angle, a next viewing angle needs to be selected continuously, and operations of rendering and stylizing are performed continuously.

In S260, a next viewing angle is selected as a current viewing angle; and then S230 is performed.

In S270, a complete stylized three-dimensional model is outputted.

Figure 4:
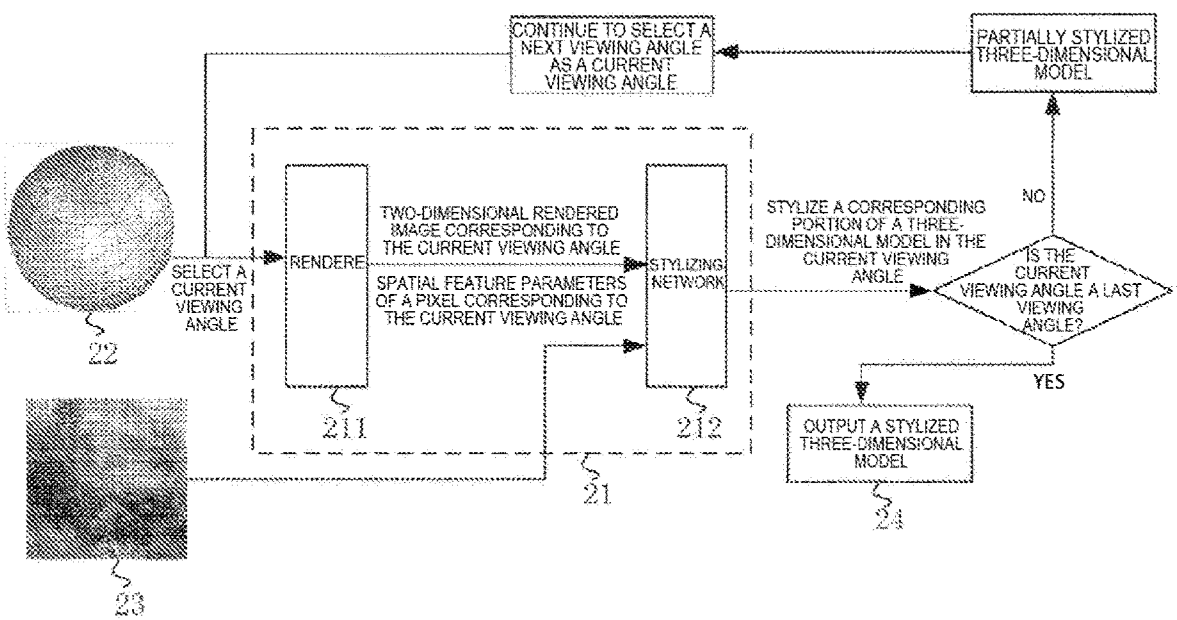
FIG. 4 is a schematic diagram of a process for stylizing a three-dimensional model according to Embodiment 2 of the present disclosure.

FIG. 4 is a schematic diagram of a process for stylizing a three-dimensional model according to Embodiment 2 of the present disclosure. As shown in FIG. 4, the predetermined network 21 includes a renderer 211 and a stylizing network 212. A to-be-stylized three-dimensional model 22 is inputted into the renderer 211. A stylized target image 23 is inputted into the stylizing network 212. An output of the stylizing network 212 is a stylized three-dimensional model 24. The renderer 211 is configured to render the three-dimensional model 22 from a selected current viewing angle to acquire a corresponding two-dimensional rendered image, and calculate spatial feature parameters of a corresponding pixel. The spatial feature parameters include an included angle between a normal direction and a sight line that correspond to each pixel, as well as a depth of the pixel. If the current viewing angle is not a first viewing angle, the spatial feature parameters further include a mask of a portion that has been stylized in a previous viewing angle. The spatial feature parameters of the current viewing angle and the two-dimensional rendered image are combined and then inputted into the stylizing network 212. The stylizing network 212 is configured to define, based on the spatial feature parameters of the current viewing angle, a relationship between a pixel in the two-dimensional rendered image and a pixel on the surface of the three-dimensional model, thereby stylizing a texture feature of a corresponding portion of the three-dimensional model under the current viewing angle based on an image feature of the stylized target image 23.

If the current viewing angle is the last viewing angle, the output of the stylizing network 212 is the stylized three-dimensional model 24. If the current viewing angle is not the last viewing angle, the output of the stylizing network 212 is a partially stylized three-dimensional model. The partially stylized three-dimensional model is re-inputted into the renderer 211 from a reselected viewing angle. Therefore, a process of rendering and stylizing in different viewing angles is a serial process. In other words, for a viewing angle, only a corresponding portion in the three-dimensional model can be stylized after rendering is performed each time. A rendering operation and a stylizing operation in each viewing angle are performed continuously based on rendering and stylizing in a previous viewing angle. The same operations are performed until rendering and stylizing are performed in the last viewing angle for the last time. An output model is denoted as a complete stylized three-dimensional model.

A process of stylizing the three-dimensional model is described below with reference to examples.

Assuming that there are n viewing angles determined in total (n≥2, n being a positive number), firstly, a first viewing angle (n=1) is selected and is denoted as $V_1$. The renderer renders the three-dimensional model from $V_1$ to acquire a corresponding two-dimensional rendered image $I_1$, wherein $I_1$ includes a texture feature $F_1$ that is on the surface of the three-dimensional model and is visible from $V_1$. The renderer may further acquire a spatial feature parameter $S_1$ of a pixel in $I_1$, wherein $S_1$ may include an included angle $\alpha_{i1}$ between a sight line of each pixel i from $V_1$ and a normal direction corresponding to $V_1$, as well as a depth $D_{i1}$ of each pixel i under the current viewing angle. The stylizing network stylizes, based on stylized target images $I_0$, $F_1$, $S_1$, and $I_1$, a texture feature that is on the surface of the three-dimensional model and is visible from the current viewing angle, and outputs R1. A next viewing angle $V_2$ (n=2) is selected. The renderer renders the three-dimensional model from $V_2$ to acquire a corresponding two-dimensional rendered image $I_2$, wherein $I_2$ includes a texture feature $F_2$ that is on the surface of the three-dimensional model and is visible from $V_2$. The renderer may further acquire a spatial feature parameter $S_2$ of a pixel in $I_2$, wherein $S_2$ may include an included angle $\alpha_{i2}$ between a sight line of each pixel i from $V_2$ and a normal direction corresponding to $V_2$, a depth $D_{i2}$ of each pixel i under the current viewing angle, as well as a mask $M_1$ of a portion that is in $I_2$ and has been stylized in $V_1$. The stylizing network stylizes, based on $I_0$, $F_2$, $S_2$, $M_1$, and $I_2$, the texture feature that is on the surface of the three-dimensional model and is visible from the current viewing angle, and outputs R2, wherein R2 includes not only the portion that has been stylized in the viewing angle $V_1$-, but also a portion that is stylized in the viewing angle $V_2$.

If $V_2$ is the last viewing angle, R2 is a stylized result. If $V_2$ is not the last viewing angle, a next viewing angle $V_3$ is continuously selected, and the foregoing rendering and stylizing operations are repeated until the stylizing network outputs a complete stylized three-dimensional model in the last viewing angle.

For each viewing angle $V_k$ (k≥2, n being a positive number) other than the first viewing angle, the spatial feature parameters of the pixel corresponding to this viewing angle further include a mask $M_{k-1}$ of a portion that is in the two-dimensional rendered image $I_k$ corresponding to the viewing angle $V_k$ and has been stylized in a viewing angle $V_{k-1}$.

In addition, in order to ensure the effect of stylizing a texture feature of a pixel at the junction of different viewing angles, the field-of-view ranges of adjacent viewing angles may be moved to be overlapped. Generally, three or more viewing angles are selected.

In an embodiment, the method further includes: training the predetermined network based on a sample model and the stylized target image until a value of a loss function of the predetermined network satisfies a requirement, wherein the value of the loss function is determined based on values of the following three functions:

a content loss function configured to evaluate a loss between a stylized result and the sample model; a style loss function configured to evaluate a loss between the stylized result and the stylized target image; and a continuity loss function configured to evaluate a super-resolution test sequence (Visual Geometry Group, VGG) loss between the stylized result and a sample model partially stylized in the previous viewing angle.

In this embodiment, content mainly refers to a structure and an outline of the sample model or the stylized result. An index used for measuring a content difference between the sample model and the stylized result may be a Euclidean distance. A style mainly refers to a texture rule, a color rule, visual feeling, or the like of the stylized target image or the stylized result. A style difference between the stylized target image and the stylized result may be represented by a Gram matrix between feature maps on the same hidden layer. Continuity mainly refers to continuity between texture features of the stylized result and the sample model partially stylized in the previous viewing angle, and may be represented by a VGG loss.

The stylized result may be a stylized sample model. The predetermined network may be trained in advance by using the sample model and the stylized target image, so that the predetermined network can learn a rule of acquiring the stylized result from the sample model and the stylized target image. Therefore, the predetermined network may be actually used for stylizing the three-dimensional model. A loss function used in the training process may be set by using the foregoing three loss functions. For example, the loss function is a sum or a weighted sum of the three loss functions, to ensure that content of the stylized result is similar to that of the sample model, that a style of the stylized result is similar to a style of the stylized target image, and that a VGG between an outputted stylized result and a stylized result in a previous viewing angle (the penultimate viewing angle) is the minimum.

For example, the training process is as follows: rendering and stylizing the sample model by using an initial predetermined network to obtain a stylized result in the current viewing angle; and calculating a content loss $L_{Content}$ between the stylized result and the sample model, a style loss $L_{Style}$ between the stylized result and the stylized target image, and a VGG loss $L_{VGG}$ between the stylized result and a stylized result in a previous viewing angle. Network parameters in the predetermined network are trained and adjusted constantly to ensure that an overall loss function is the minimum. Therefore, performances of the predetermined network are optimized, and the predetermined network has good robustness. For example, the overall loss function is $I=L_{Content}+L_{style}+L_{VGG}$.

In an embodiment, the style loss function is a weighted sum of losses between an image feature of the stylized target image and image features of a plurality of pixels in the stylized result, wherein a weight corresponding to each pixel is negatively correlated with an included angle between the normal direction and a sight line that correspond to the pixel.

In this embodiment, during calculation of a value of the style loss function between the stylized result and the sample model, a loss between an image feature of each pixel and an image feature of the stylized target image is weighted, and a weight corresponding to each pixel is correlated with an included angle between the normal direction and a sight line that correspond to this pixel. For example, a larger included angle between the normal direction and the sight line to the pixel leads to a greater deviation of this pixel from the current viewing angle, as well as a smaller corresponding weight. Therefore, influences on a style loss of a portion that is of the sample model and deforms greatly during drawing of the two-dimensional rendered image can be reduced.

In an embodiment, an image feature of each pixel in the stylized result is determined by performing weighted convolution on pixels surrounding this pixel, wherein a weight of the convolution is negatively correlated with a depth difference between this pixel and the surrounding pixels.

In this embodiment, in a process of calculating a style loss function, feature extraction is performed on the two-dimensional rendered image or the stylized target image by using weighted convolution. For a pixel, a weight of the convolution is correlated with a depth difference between this pixel and the surrounding pixels. A larger depth difference between this pixel and the surrounding pixels leads to a smaller corresponding weight. On this basis, it can be ensured that discontinuous positions in the sample model are still discontinuous after stylization.

In an embodiment, the continuity loss function is a weighted sum of VGG losses between a pixel corresponding to the sample model partially stylized in the previous viewing angle and a plurality of pixels in the stylized result, wherein a weight corresponding to each pixel is positively correlated with an included angle between the normal direction and a sight line that correspond to this pixel.

In this embodiment, during calculation of a value of the VGG loss function between the stylized result and the sample model partially stylized in the previous viewing angle, a VGG loss of each pixel is weighted, and a weight corresponding to each pixel is correlated with an included angle between a normal direction and a sight line that correspond to this pixel. For example, a larger included angle between the normal direction and the sight line to this pixel leads to a greater deviation of this pixel from the current viewing angle, as well as a larger corresponding weight. Therefore, the continuity of a portion that is of the sample model and deforms greatly during drawing of the two-dimensional rendered image may be mainly taken into consideration to reduce a deformation problem.

According to the method for stylizing the three-dimensional model provided in this embodiment, before the two-dimensional rendered image is inputted into the stylizing network, differentiable rendering of the spatial feature parameters and calculation of the spatial feature parameters may also be performed, so that the stylizing network is enabled to define a spatial position relationship, in the three-dimensional model, of each pixel in the two-dimensional rendered image, thereby ensuring the conformity in spatial structures of the three-dimensional model before and after stylization. A task of stylizing the three-dimensional model is decomposed into a plurality of serial processes from a plurality of viewing angles. Rendering and stylization in each viewing angle are both performed based on rendering and stylization in a previous viewing angle. Therefore, overall stylization of the three-dimensional model is completed gradually, thereby ensuring the continuity of the stylized three-dimensional model and the conformity in spatial structures of the three-dimensional model before and after stylization. Losses between the stylized result and the sample model are evaluated comprehensively based on the style loss function, the content loss function, and the continuity loss function, and style losses, convolutions, and VGG losses corresponding to different pixels are weighted, so that the deformation in the stylizing process is reduced, such that the influence of discontinuity of texture features of adjacent pixels on stylization is taken into consideration, and the three-dimensional model is stylized with high quality in all directions.

Embodiment 3

Figure 5:
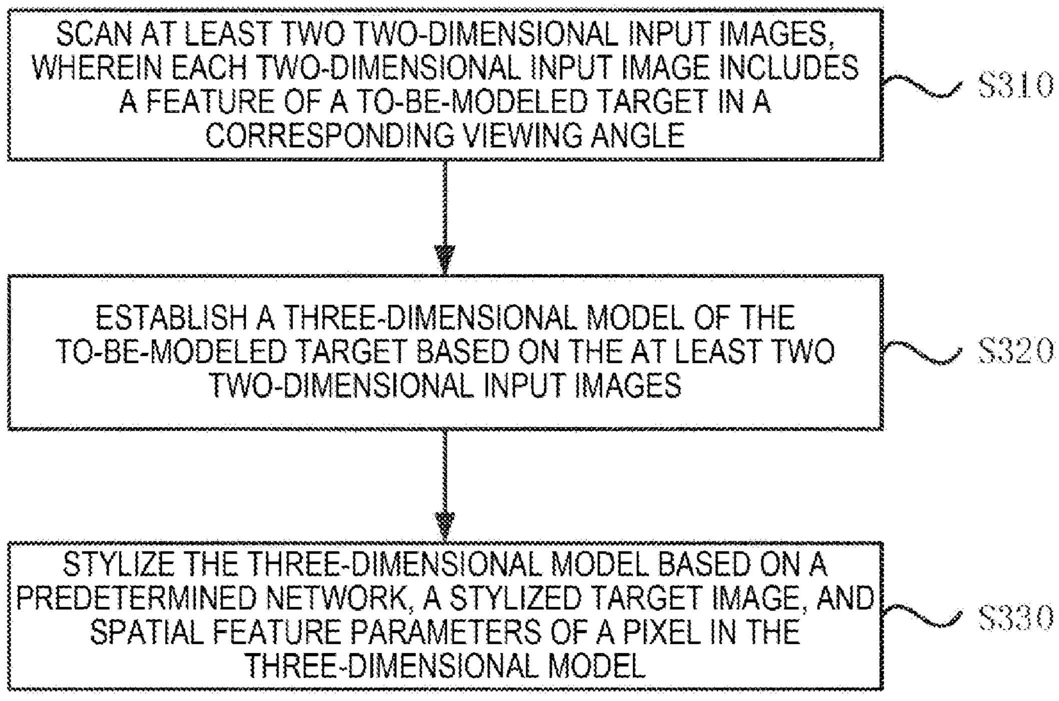
FIG. 5 is a flowchart of a method for stylizing a three-dimensional model according to Embodiment 3 of the present disclosure.

FIG. 5 is a flowchart of a method for stylizing a three-dimensional model according to Embodiment 3 of the present disclosure. The method may be applicable to establishing a three-dimensional model based on a plurality of two-dimensional input images and stylizing the three-dimensional model. An electronic device in this embodiment may be, for example, a computer, a notebook computer, a server, a tablet computer, a smartphone, or another device that has an image processing function. The content that is of this embodiment and is not described in detail may refer to the foregoing embodiments.

As shown in FIG. 5, Embodiment 3 of the present disclosure provides a method for stylizing a three-dimensional model. The method includes the following steps.

In S310, scanning at least two two-dimensional input images, wherein each two-dimensional input image comprises a feature of a to-be-modeled target in a corresponding viewing angle.

In this embodiment, at least two two-dimensional input images are used to reflect the shapes, colors, textures and other features of the same to-be-modeled target in different viewing angles, providing a basis for establishing the three-dimensional model. To ensure accurate modeling, the at least two two-dimensional input images need to contain feature information of all positions on a surface of the to-be-modeled target. The two-dimensional input image may be downloaded from a network image library, or may be inputted or specified by a user. For example, the to-be-modeled target is a table. A photo is taken each time when 60 degrees' rotation is performed in a counterclockwise direction at the same horizontal height. This ensures that a feature of the same position of the target can be found in photos taken in adjacent viewing angles. A plurality of acquired photos may be used as two-dimensional input images.

In S320, establishing a three-dimensional model of the to-be-modeled target based on the at least two two-dimensional input images.

In this embodiment, a process of establishing the three-dimensional model based on the two-dimensional input image may alternatively be a three-dimensional process of the two-dimensional input image. A three-dimensional structure of the to-be-modeled target may be restored based on a plurality of two-dimensional input images in different viewing angles. For example, for the plurality of photos, the three-dimensional model of the to-be-modeled target, namely, the to-be-stylized three-dimensional model, is determined based on the viewing angles of the photos, two-dimensional coordinates of each pixel in the photos, correlations between the same pixel and its surrounding pixels in the photos taken in different viewing angles.

In S330, stylizing the three-dimensional model based on a predetermined network, a stylized target image, and spatial feature parameters of a pixel in the three-dimensional model.

In this embodiment, the predetermined network may be a deep neural network that is trained in advance. A to-be-stylized three-dimensional model and a stylized target image are inputted to the predetermined network. The three-dimensional model provides a content feature, the stylized target image provides a style feature, and a stylized three-dimensional model is acquired and outputted by combining the content feature with the style feature. In a process of stylizing the three-dimensional model in the predetermined network, spatial feature parameters of a pixel in the three-dimensional model may be used. The spatial feature parameters may include an included angle between a normal direction and a sight line that correspond to each pixel, a depth of the pixel, and the like, and are configured to determine a correspondence between a pixel on a surface of the three-dimensional model and a position at which the pixel is drawn in a two-dimensional space. Therefore, stylization is performed on a two-dimensional basis, and a stylized texture feature is then restored to a corresponding position on the surface of the three-dimensional model. In an embodiment, spatial feature parameters of a pixel may be acquired by the renderer.

Based on the above, the method of stylizing the three-dimensional model based on the predetermined network, the stylized target image, and the spatial feature parameters of the pixel in the three-dimensional model is determined according to any one of the foregoing embodiments.

According to the method for stylizing the three-dimensional model in this embodiment, a corresponding three-dimensional model may be established automatically based on two-dimensional input images that are of a scanned to-be-modeled target and correspond to different viewing angles. The three-dimensional model is stylized by using the spatial feature parameters of the pixel in the three-dimensional model. Therefore, the method can implement modeling of any target, can satisfy stylizing requirements of different users for the three-dimensional model, and has wide applicability.

Embodiment 4

Figure 6:
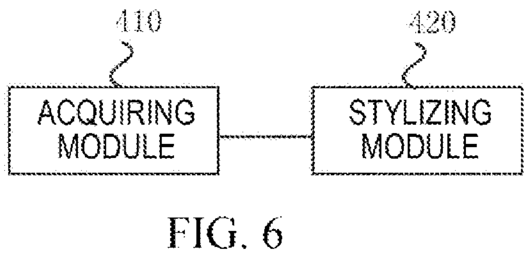
FIG. 6 is a schematic structural diagram of an apparatus for stylizing a three-dimensional model according to Embodiment 4 of the present disclosure.

FIG. 6 is a schematic structural diagram of an apparatus for stylizing a three-dimensional model according to Embodiment 4 of the present disclosure. The content that is of this embodiment and is not described in detail may refer to the foregoing embodiments.

As shown in FIG. 6, the apparatus includes:

an acquiring module 410, configured to acquire a to-be-stylized three-dimensional model and a stylized target image; and a stylizing module 420, configured to: render the three-dimensional model by using a predetermined network to acquire a two-dimensional rendered image and spatial feature parameters of a pixel, and stylize a texture feature in the two-dimensional rendered image based on the spatial feature parameters and the stylized target image to acquire a stylized three-dimensional model.

According to the apparatus for stylizing the three-dimensional model in this embodiment, the three-dimensional model is rendered into a two-dimensional image, and a spatial relationship of each pixel is taken into consideration, so that all pixels in the two-dimensional rendered image, including adjacent pixels whose texture features are discontinuous, can be stylized, thereby ensuring the conformity in spatial structures of the three-dimensional model before and after stylization.

Based on the above, the stylizing module 420 is configured to:

determine a plurality of viewing angles whose field-of-view ranges cover the three-dimensional model; render the three-dimensional model from a current viewing angle by using the predetermined network to acquire a two-dimensional rendered image corresponding to the current viewing angle and spatial feature parameters of a pixel corresponding to the current viewing angle, and stylize a texture feature in the two-dimensional rendered image corresponding to the current viewing angle based on the spatial feature parameters of the pixel corresponding to the current viewing angle and the stylized target image; and continue to select a next viewing angle as a current viewing angle, and repeatedly perform a rendering operation and a stylizing operation from the current viewing angle until a complete stylized three-dimensional model is acquired.

Based on the above, field-of-view ranges of adjacent viewing angles are overlapped; and the stylizing module 420 is configured to stylize the texture features in the two-dimensional rendered image corresponding to the current viewing angle in the following way:

stylizing a texture feature of a portion that is in the two-dimensional rendered image corresponding to the current viewing angle but does not appear in a two-dimensional rendered image corresponding to a previous viewing angle, wherein the previous viewing angle is a viewing angle from which the rendering operation and the stylizing operation have been performed.

Based on the above, the predetermined network comprises a renderer and a stylizing network; the spatial feature parameters of the pixel corresponding to the current viewing angle comprise an included angle between a normal direction and a sight line that correspond to the pixel corresponding to the current viewing angle, as well as a depth of the pixel corresponding to the current viewing angle; and in a case that the current viewing angle is not a first viewing angle, the spatial feature parameters of the pixel corresponding to the current viewing angle further comprise a mask of a portion that is in the two-dimensional rendered image corresponding to the current viewing angle and is already stylized in the previous viewing angle.

Based on the above, the apparatus also includes:

a training module, configured to train the predetermined network based on a sample model and the stylized target image until a value of a loss function of the predetermined network satisfies a requirement, wherein the value of the loss function is determined based on values of the following three functions:

a content loss function configured to evaluate a loss between a stylized result and the sample model; a style loss function configured to evaluate a loss between the stylized result and the stylized target image; and a continuity loss function configured to evaluate a super-resolution test sequence VGG loss between the stylized result and a sample model partially stylized in the previous viewing angle.

Based on the above, the style loss function is a weighted sum of losses between an image feature of the stylized target image and image features of a plurality of pixels in the stylized result, wherein a weight corresponding to each pixel is negatively correlated with an included angle between the normal direction and a sight line that correspond to the pixel.

Based on the above, an image feature of each pixel in the stylized result is determined by performing weighted convolution on pixels surrounding the pixel, wherein a weight of the convolution is negatively correlated with a depth difference between the pixel and the surrounding pixels.

Based on the above, the continuity loss function is a weighted sum of VGG losses between a pixel corresponding to the sample model partially stylized in the previous viewing angle and a plurality of pixels in the stylized result, wherein a weight corresponding to each pixel is positively correlated with an included angle between the normal direction and a sight line that correspond to the pixel.

The apparatus for stylizing the three-dimensional model may perform the method for stylizing the three-dimensional model provided in any embodiment of the present disclosure and has corresponding functional modules and effects for performing the method.

Embodiment 5

Figure 7:
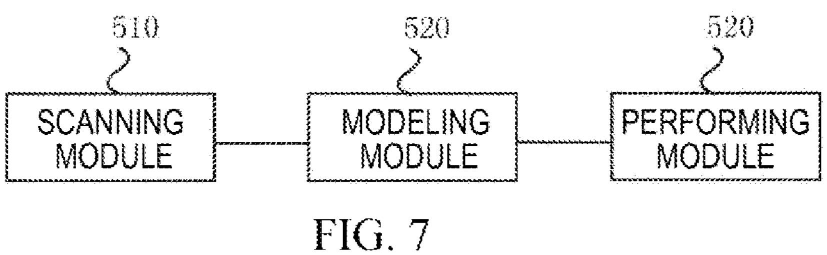
FIG. 7 is a schematic structural diagram of an apparatus for stylizing a three-dimensional model according to Embodiment 5 of the present disclosure.

FIG. 7 is a schematic structural diagram of an apparatus for stylizing a three-dimensional model according to Embodiment 5 of the present disclosure. The content that is of this embodiment and is not described in detail may refer to the foregoing embodiments.

As shown in FIG. 7, the apparatus includes:

a scanning module 510, configured to scan at least two two-dimensional input images, wherein each two-dimensional input image comprises a feature of a to-be-modeled target in a corresponding viewing angle; a modeling module 520, configured to establish a three-dimensional model of the to-be-modeled target based on the at least two two-dimensional input images; and a performing module 530, configured to stylize the three-dimensional model based on a predetermined network, a stylized target image, and spatial feature parameters of a pixel in the three-dimensional model.

According to the apparatus for stylizing the three-dimensional model in this embodiment, a corresponding three-dimensional model may be established automatically based on two-dimensional input images that are of a scanned to-be-modeled target and correspond to different viewing angles. The three-dimensional model is stylized by using spatial feature parameters of a pixel in the three-dimensional model. Therefore, the method can implement modeling of any target, can satisfy stylizing requirements of different users for the three-dimensional model, and has wide applicability.

Based on the above, the method of stylizing the three-dimensional model based on the predetermined network, the stylized target image, and the spatial feature parameters of the pixel in the three-dimensional model may be determined according to the method in any one of the foregoing embodiments.

Based on the above, a structure of the performing module 530 may refer to any one of the foregoing embodiments. For example, the performing module 530 may include:

an acquiring module, configured to acquire a to-be-stylized three-dimensional model and a stylized target image; and a stylizing module, configured to: render the three-dimensional model by using a predetermined network to acquire a two-dimensional rendered image and spatial feature parameters of a pixel, and stylize a texture feature in the two-dimensional rendered image based on the spatial feature parameters and the stylized target image to acquire a stylized three-dimensional model.

The apparatus for stylizing a three-dimensional model may perform the method for stylizing a three-dimensional model of any embodiment of the present disclosure is provided, with corresponding functional modules and effects for executing the method.

Embodiment 6

Figure 8:
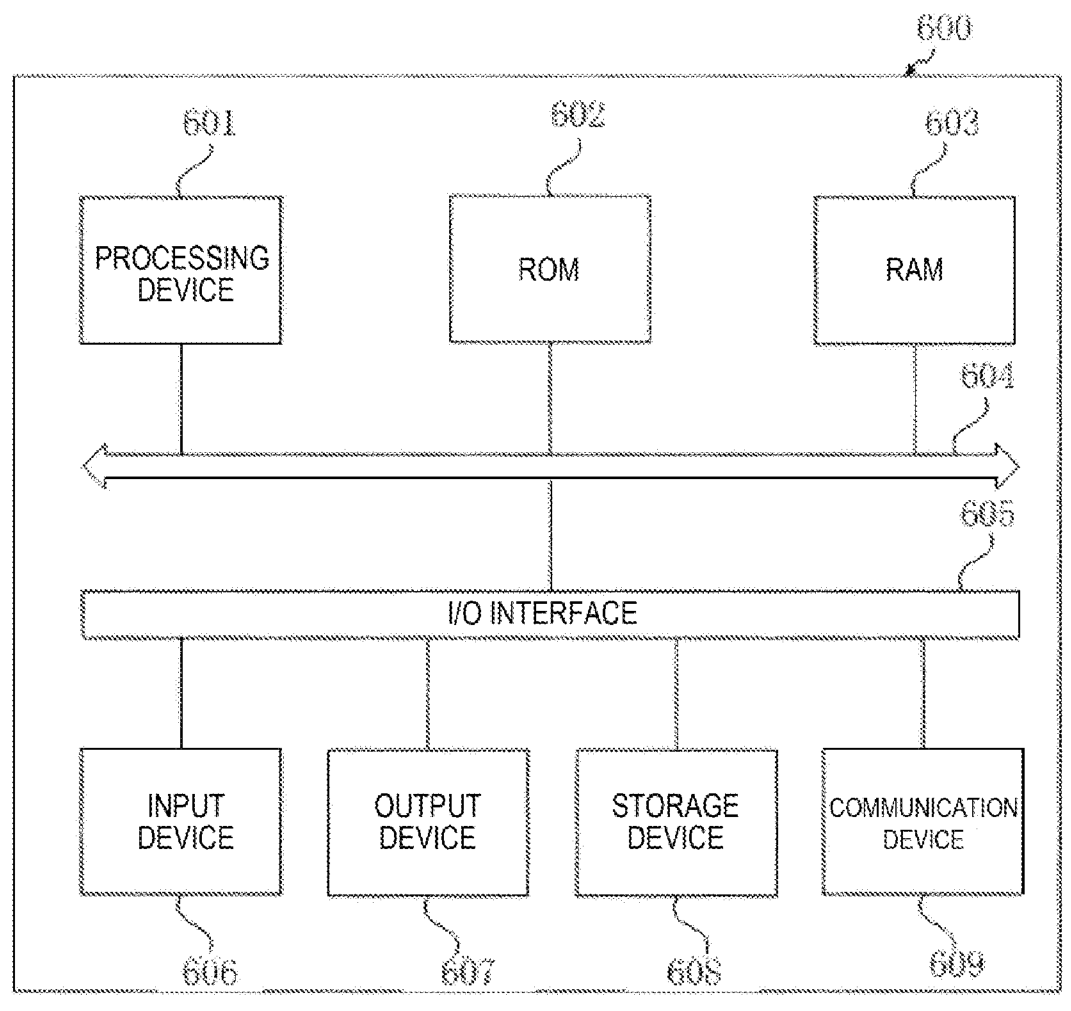
FIG. 8 is a schematic diagram of a hardware structure of an electronic device according to Embodiment 6 of the present disclosure.

FIG. 8 is a schematic structural diagram of an electronic device provided in an example of the disclosure. FIG. 8 shows a schematic structural diagram of a suitable electronic device 600 for implementing the examples of the disclosure. The electronic device 600 in the example of the disclosure may include but is not limited to a computer, a laptop computer, a server, a tablet computer or a smart phone and other devices having an image processing function. The electronic device 600 shown in FIG. 8 is only an example and should not bring any restrictions on the functions and scope of use of the examples of the disclosure.

As shown in FIG. 8, the electronic device 600 may include one or more processing devices (such as a Central Processor, graphics processing unit, etc.) 601, which can perform various appropriate actions and processes based on programs stored in Read-Only Memory (ROM) 602 or loaded from storage device 608 into Random Access Memory (RAM) 603. One or more processing devices 601 implement the traffic data packet forwarding method provided in this disclosure. In RAM 603, various programs and data required for the operation of the electronic device 600 are also stored. Processing devices 601, ROM 602, and RAM 603 are connected to each other through bus 605. Input/Output (I/O) interface 604 is also connected to bus 605.

Typically, the following devices can be connected to the I/O interface 604: input devices 606 including touch screens, touchpads, keyboards, mice, cameras, microphones, accelerometers, gyroscopes, etc.; output devices 607 including liquid crystal displays (LCDs), speakers, vibrators, etc.; storage devices 608 including magnetic tapes, hard disks, etc., which are set to store one or more programs; and communication devices 609. Communication devices 609 can allow electronic devices 600 to communicate wireless or wield with other devices to exchange data. Although FIG. 8 shows an electronic device 600 with multiple devices, it is not required to implement or have all of the devices shown. More or fewer devices can be implemented or provided instead.

According to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from the network through the communication device 609, or installed from the storage device 608, or from the ROM 602. When the computer program is executed by the processing device 601, the above-described functions defined in the method of the present disclosure are performed.

The computer-readable storage medium described above can be a computer-readable signal medium or a computer-readable storage medium, or any combination thereof. The computer-readable storage medium is, for example, but not limited to, an electrical, magnetic, optical, electromagnetic, infrared, or semiconductor system, apparatus, or device, or any combination thereof. Examples of computer-readable storage medium may include but are not limited to an electrical connection with one or more wires, a portable computer disk, a hard disk, RAM, ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium can be any tangible medium containing or storing a program that can be used by an instruction execution system, apparatus, or device or in combination therewith. In the present disclosure, a computer-readable signal medium may include a data signal propagated in a baseband or as part of a carrier wave, which carries computer-readable program code. Such propagated data signals can take many forms, including but not limited to electromagnetic signals, optical signals, or any suitable combination thereof. Computer-readable signal medium can also be any computer-readable medium other than computer-readable storage medium, which can send, propagate, or transmit programs for use by or in conjunction with instruction execution systems, apparatus, or devices. The program code contained on the computer-readable medium can be transmitted using any suitable medium, including but not limited to wires, optical cables, radio frequency (RF), etc., or any suitable combination thereof.

In some implementation methods, clients and servers can communicate using any currently known or future developed network protocol such as HyperText Transfer Protocol (HTTP), and can interconnect with any form or medium of digital data communication (such as communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium can be included in the electronic device, or it can exist alone without being assembled into the electronic device.

The computer-readable medium carries one or more programs, and when the one or more programs are executed by the electronic device, the electronic device: acquires a to-be-stylized three-dimensional model and a stylized target image; renders the three-dimensional model by using a predetermined network to acquire a two-dimensional rendered image and spatial feature parameters of a pixel, and stylizes a texture feature in the two-dimensional rendered image based on the spatial feature parameters and the stylized target image to acquire a stylized three-dimensional model. Alternatively, the electronic device: scans at least two two-dimensional input images, wherein each two-dimensional input image comprises a feature of a to-be-modeled target in a corresponding viewing angle; establishes a three-dimensional model of the to-be-modeled target based on the at least two two-dimensional input images; and stylizes the three-dimensional model based on a predetermined network, a stylized target image, and spatial feature parameters of a pixel in the three-dimensional model.

It may be one or more programming languages or combinations thereof to write computer program code for performing the operations of the present disclosure. The above-described programming languages include but are not limited to Object Oriented programming languages—such as Java, Smalltalk, C++, further including conventional procedural programming languages—such as "C" language or similar programming languages. The program code may be executed entirely on the user's computer, executed partially on the user's computer, executed as a standalone software package, executed partially on the user's computer and partially on a remote computer, or executed entirely on a remote computer or server. In the case of a remote computer, the remote computer may be any kind of network—including LAN or WAN—connected to the user's computer or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. In this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in the opposite order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

The units described in the disclosed embodiments can be implemented by software or hardware. The name of the unit does not limit the unit itself in one case. For example, the acquiring module can also be described as "a module for acquiring a to-be-stylized three-dimensional model and a stylized target image."

The functions described above in this article can be performed at least in part by one or more hardware logic components. For example, without limitation, exemple types of hardware logic components that can be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, machine-readable medium can be tangible medium that can contain or store programs for use by or in conjunction with instruction execution systems, apparatus, or devices. Machine-readable medium can be machine-readable signal medium or machine-readable storage medium. Machine-readable medium can include, but are not limited to, electronic, magnetic, optical, electromagnetic, infrared, or semiconductor systems, apparatus, or devices, or any suitable combination thereof. Examples of machine-readable storage medium may include electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, Example 1 provides a method for stylizing a three-dimensional model, comprising:

- acquiring a to-be-stylized three-dimensional model and a stylized target image; and
- rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model.

Example 2: The method according to Example 1, wherein the rendering the three-dimensional model by using the predetermined network to acquire the two-dimensional rendered image and the spatial feature parameters of the pixel, and stylizing the texture feature in the two-dimensional rendered image based on the spatial feature parameters and the stylized target image to acquire the stylized three-dimensional model comprises:

- determining a plurality of viewing angles whose field-of-view ranges cover the three-dimensional model;
- rendering the three-dimensional model from a current viewing angle by using the predetermined network to acquire a two-dimensional rendered image corresponding to the current viewing angle and spatial feature parameters of a pixel corresponding to the current viewing angle, and stylizing the texture feature in the two-dimensional rendered image corresponding to the current viewing angle based on the spatial feature parameters of the pixel corresponding to the current viewing angle and the stylized target image; and
- continuing to select a next viewing angle as a current viewing angle, and repeatedly performing a rendering operation and a stylizing operation from the current viewing angle until a complete stylized three-dimensional model is acquired.

Example 3: The method according to Example 2, wherein the field-of-view ranges of adjacent viewing angles are overlapped; and

- the stylizing the texture feature in the two-dimensional rendered image corresponding to the current viewing angle comprises:
- stylizing the texture feature of a portion that is in the two-dimensional rendered image corresponding to the current viewing angle but does not appear in a two-dimensional rendered image corresponding to a previous viewing angle, wherein the previous viewing angle is a viewing angle from which the rendering operation and the stylizing operation have been performed.

Example 4: The method according to Example 2, wherein the predetermined network comprises a renderer and a stylizing network;

- the spatial feature parameters of the pixel corresponding to the current viewing angle comprise an included angle between a normal direction and a sight line that correspond to the pixel corresponding to the current viewing angle, as well as a depth of the pixel corresponding to the current viewing angle; and
- in a case that the current viewing angle is not a first viewing angle, the spatial feature parameters of the pixel corresponding to the current viewing angle further comprise a mask of a portion that is in the two-dimensional rendered image corresponding to the current viewing angle and is already stylized in the previous viewing angle.

Example 5: The method according to Example 2, further comprising:

- training the predetermined network based on a sample model and the stylized target image until a value of a loss function of the predetermined network satisfies a requirement, wherein the value of the loss function is determined based on values of the following three functions:
- a content loss function configured to evaluate a loss between a stylized result and the sample model;
- a style loss function configured to evaluate a loss between the stylized result and the stylized target image; and
- a continuity loss function configured to evaluate a super-resolution test sequence VGG loss between the stylized result and a sample model partially stylized in the previous viewing angle.

Example 6: The method according to Example 5, wherein the style loss function is a weighted sum of losses between an image feature of the stylized target image and image features of a plurality of pixels in the stylized result, wherein a weight corresponding to each pixel is negatively correlated with an included angle between the normal direction and a sight line that correspond to the pixel.

Example 7: The method according to Example 6, wherein an image feature of each pixel in the stylized result is determined by performing weighted convolution on pixels surrounding the pixel, wherein a weight of the convolution is negatively correlated with a depth difference between the pixel and the surrounding pixels.

Example 8: The method according to Example 5, wherein the continuity loss function is a weighted sum of VGG losses between a pixel corresponding to the sample model partially stylized in the previous viewing angle and a plurality of pixels in the stylized result, wherein a weight corresponding to each pixel is positively correlated with an included angle between the normal direction and a sight line that correspond to the pixel.

According to one or more embodiments of the present disclosure, Example 9 provides a method for stylizing a three-dimensional model, comprising:

scanning at least two two-dimensional input images, wherein each two-dimensional input image comprises a feature of a to-be-modeled target in a corresponding viewing angle;

establishing a three-dimensional model of the to-be-modeled target based on the at least two two-dimensional input images; and stylizing the three-dimensional model based on a predetermined network, a stylized target image, and spatial feature parameters of a pixel in the three-dimensional model.

Example 10: The method according to Example 9, wherein the method for stylizing the three-dimensional model based on the predetermined network, the stylized target image, and the spatial feature parameters of the pixel in the three-dimensional model is determined according to any one of Examples 1 to 8.

According to one or more embodiments of the present disclosure, Example 11 provides an apparatus for stylizing a three-dimensional model, comprising:

an acquiring module, configured to acquire a to-be-stylized three-dimensional model and a stylized target image; and a stylizing module, configured to: render the three-dimensional model by using a predetermined network to acquire a two-dimensional rendered image and spatial feature parameters of a pixel, and stylize a texture feature in the two-dimensional rendered image based on the spatial feature parameters and the stylized target image to acquire a stylized three-dimensional model.

According to one or more embodiments of the present disclosure, Example 12 provides an apparatus for stylizing a three-dimensional model, comprising:

a scanning module, configured to scan at least two two-dimensional input images, wherein each two-dimensional input image comprises a feature of a to-be-modeled target in a corresponding viewing angle;

a modeling module, configured to establish a three-dimensional model of the to-be-modeled target based on the at least two two-dimensional input images; and a performing module, configured to stylize the three-dimensional model based on a predetermined network, a stylized target image, and spatial feature parameters of a pixel in the three-dimensional model.

Example 13 The device according to Example 12, the method for stylizing a three-dimensional model is determined according to any one of Examples 1-8 based on a predetermined network, a stylized target image, and spatial feature parameters of a pixel in the three-dimensional model.

According to one or more embodiments of the present disclosure, Example 14 provides an electronic device, comprising:

at least one processor; and a storage device, configured to store at least one program, wherein the at least one program, when executed by the at least one processor, causes the at least one processor to implement the method for stylizing the three-dimensional model according to any one of Examples 1 to 10.

According to one or more embodiments of the present disclosure, Example 15 provides a method for stylizing a three-dimensional model of any one of Examples 1-10 implemented when the program is executed by a processor.

In addition, although multiple operations are depicted in a specific order, this should not be understood as requiring these operations to be performed in the specific order shown or in sequential order. Under certain circumstances, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub-combination.

What is claimed is:

1. A method for stylizing a three-dimensional model, comprising:

acquiring a to-be-stylized three-dimensional model and a stylized target image; and rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model, the stylizing comprising:

in response to determining a plurality of viewing angles whose field-of-view ranges cover the three-dimensional model and the field-of-view ranges of adjacent viewing angles are overlapped, stylizing the texture feature of a portion that is in the two-dimensional rendered image corresponding to a current viewing angle of the plurality of viewing angles but does not appear in a two-dimensional rendered image corresponding to a previous viewing angle of the plurality of viewing angles, wherein the previous viewing angle is a viewing angle from which the rendering operation and the stylizing operation have been performed.

2. The method according to claim 1, wherein the acquiring a to-be-stylized three-dimensional model and a stylized target image comprises:

scanning at least two two-dimensional input images, wherein each two-dimensional input image comprises a feature of a to-be-modeled target in a corresponding viewing angle; and establishing the three-dimensional model of the to-be-modeled target based on the at least two two-dimensional input images.

3. The method according to claim 1, wherein the rendering the three-dimensional model by using the predetermined network to acquire the two-dimensional rendered image and the spatial feature parameters of the pixel, and stylizing the texture feature in the two-dimensional rendered image based on the spatial feature parameters and the stylized target image to acquire the stylized three-dimensional model comprises:

determining the plurality of viewing angles;

rendering the three-dimensional model from the current viewing angle by using the predetermined network to acquire a two-dimensional rendered image corresponding to the current viewing angle and spatial feature parameters of a pixel corresponding to the current viewing angle, and stylizing the texture feature in the two-dimensional rendered image corresponding to the current viewing angle based on the spatial feature parameters of the pixel corresponding to the current viewing angle and the stylized target image; and continuing to select a next viewing angle as a current viewing angle, and repeatedly performing a rendering operation and a stylizing operation from the current viewing angle until a complete stylized three-dimensional model is acquired.

4. The method according to claim 3, wherein the predetermined network comprises a renderer and a stylizing network;

the spatial feature parameters of the pixel corresponding to the current viewing angle comprise an included angle between a normal direction and a sight line that correspond to the pixel corresponding to the current viewing angle, as well as a depth of the pixel corresponding to the current viewing angle; and in a case that the current viewing angle is not a first viewing angle, the spatial feature parameters of the pixel corresponding to the current viewing angle further comprise a mask of a portion that is in the two-dimensional rendered image corresponding to the current viewing angle and is already stylized in the previous viewing angle.

5. The method according to claim 3, further comprising:

training the predetermined network based on a sample model and the stylized target image until a value of a loss function of the predetermined network satisfies a requirement, wherein the value of the loss function is determined based on values of the following three functions:

a content loss function configured to evaluate a loss between a stylized result and the sample model;

a style loss function configured to evaluate a loss between the stylized result and the stylized target image; and a continuity loss function configured to evaluate a super-resolution test sequence VGGloss between the stylized result and a sample model partially stylized in the previous viewing angle.

6. The method according to claim 5, wherein the style loss function is a weighted sum of losses between an image feature of the stylized target image and image features of a plurality of pixels in the stylized result, wherein a weight corresponding to each pixel is negatively correlated with an included angle between the normal direction and a sight line that correspond to the pixel.

7. The method according to claim 6, wherein an image feature of each pixel in the stylized result is determined by performing weighted convolution on pixels surrounding the pixel, wherein a weight of the convolution is negatively correlated with a depth difference between the pixel and the surrounding pixels.

8. The method according to claim 5, wherein the continuity loss function is a weighted sum of VGG losses between a pixel corresponding to the sample model partially stylized in the previous viewing angle and a plurality of pixels in the stylized result, wherein a weight corresponding to each pixel is positively correlated with an included angle between the normal direction and a sight line that correspond to the pixel.

9. An electronic device, comprising:

at least one processor; and a storage device, configured to store at least one program, wherein the at least one program, when executed by the at least one processor, causes the at least one processor to implement acts comprising:

acquiring a to-be-stylized three-dimensional model and a stylized target image; and rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model, the stylizing comprising:

in response to determining a plurality of viewing angles whose field-of-view ranges cover the three-dimensional model and the field-of-view ranges of adjacent viewing angles are overlapped, stylizing the texture feature of a portion that is in the two-dimensional rendered image corresponding to a current viewing angle of the plurality of viewing angles but does not appear in a two-dimensional rendered image corresponding to a previous viewing angle of the plurality of viewing angles, wherein the previous viewing angle is a viewing angle from which the rendering operation and the stylizing operation have been performed.

10. The electronic device according to claim 9, wherein the acquiring a to-be-stylized three-dimensional model and a stylized target image comprises:

scanning at least two two-dimensional input images, wherein each two-dimensional input image comprises a feature of a to-be-modeled target in a corresponding viewing angle; and establishing the three-dimensional model of the to-be-modeled target based on the at least two two-dimensional input images.

11. The electronic device according to claim 9, wherein the rendering the three-dimensional model by using the predetermined network to acquire the two-dimensional rendered image and the spatial feature parameters of the pixel, and stylizing the texture feature in the two-dimensional rendered image based on the spatial feature parameters and the stylized target image to acquire the stylized three-dimensional model comprises:

determining the plurality of viewing angles;

rendering the three-dimensional model from the current viewing angle by using the predetermined network to acquire a two-dimensional rendered image corresponding to the current viewing angle and spatial feature parameters of a pixel corresponding to the current viewing angle, and stylizing the texture feature in the two-dimensional rendered image corresponding to the current viewing angle based on the spatial feature parameters of the pixel corresponding to the current viewing angle and the stylized target image; and continuing to select a next viewing angle as a current viewing angle, and repeatedly performing a rendering operation and a stylizing operation from the current viewing angle until a complete stylized three-dimensional model is acquired.

12. The electronic device according to claim 11, wherein the predetermined network comprises a renderer and a stylizing network;

the spatial feature parameters of the pixel corresponding to the current viewing angle comprise an included angle between a normal direction and a sight line that correspond to the pixel corresponding to the current viewing angle, as well as a depth of the pixel corresponding to the current viewing angle; and in a case that the current viewing angle is not a first viewing angle, the spatial feature parameters of the pixel corresponding to the current viewing angle further comprise a mask of a portion that is in the two-dimensional rendered image corresponding to the current viewing angle and is already stylized in the previous viewing angle.

13. The electronic device according to claim 11, the acts further comprising:

training the predetermined network based on a sample model and the stylized target image until a value of a loss function of the predetermined network satisfies a requirement, wherein the value of the loss function is determined based on values of the following three functions:

a content loss function configured to evaluate a loss between a stylized result and the sample model;

a style loss function configured to evaluate a loss between the stylized result and the stylized target image; and a continuity loss function configured to evaluate a super-resolution test sequence VGG loss between the stylized result and a sample model partially stylized in the previous viewing angle.

14. A non-transitory computer-readable storage medium, configured to store a computer program, wherein the program, when executed by a processor, causes the processor to implement acts comprising:

acquiring a to-be-stylized three-dimensional model and a stylized target image; and rendering the three-dimensional model by using a predetermined network to acquire a two-dimensional rendered image and spatial feature parameters of a pixel, and stylizing a texture feature in the two-dimensional rendered image based on the spatial feature parameters and the stylized target image to acquire a stylized three-dimensional model, the stylizing comprising:

in response to determining a plurality of viewing angles whose field-of-view ranges cover the three-dimensional model and the field-of-view ranges of adjacent viewing angles are overlapped, stylizing the texture feature of a portion that is in the two-dimensional rendered image corresponding to a current viewing angle of the plurality of viewing angles but does not appear in a two-dimensional rendered image corresponding to a previous viewing angle of the plurality of viewing angles, wherein the previous viewing angle is a viewing angle from which the rendering operation and the stylizing operation have been performed.

15. The non-transitory computer-readable storage medium according to claim 14, wherein the acquiring a to-be-stylized three-dimensional model and a stylized target image comprises:

scanning at least two two-dimensional input images, wherein each two-dimensional input image comprises a feature of a to-be-modeled target in a corresponding viewing angle; and establishing the three-dimensional model of the to-be-modeled target based on the at least two two-dimensional input images.

16. The non-transitory computer-readable storage medium according to claim 14, wherein the rendering the three-dimensional model by using the predetermined network to acquire the two-dimensional rendered image and the spatial feature parameters of the pixel, and stylizing the texture feature in the two-dimensional rendered image based on the spatial feature parameters and the stylized target image to acquire the stylized three-dimensional model comprises:

determining the plurality of viewing angles;

rendering the three-dimensional model from the current viewing angle by using the predetermined network to acquire a two-dimensional rendered image corresponding to the current viewing angle and spatial feature parameters of a pixel corresponding to the current viewing angle, and stylizing the texture feature in the two-dimensional rendered image corresponding to the current viewing angle based on the spatial feature parameters of the pixel corresponding to the current viewing angle and the stylized target image; and continuing to select a next viewing angle as a current viewing angle, and repeatedly performing a rendering operation and a stylizing operation from the current viewing angle until a complete stylized three-dimensional model is acquired.

17. The non-transitory computer-readable storage medium according to claim 16, wherein the predetermined network comprises a renderer and a stylizing network;

the spatial feature parameters of the pixel corresponding to the current viewing angle comprise an included angle between a normal direction and a sight line that correspond to the pixel corresponding to the current viewing angle, as well as a depth of the pixel corresponding to the current viewing angle; and in a case that the current viewing angle is not a first viewing angle, the spatial feature parameters of the pixel corresponding to the current viewing angle further comprise a mask of a portion that is in the two-dimensional rendered image corresponding to the current viewing angle and is already stylized in the previous viewing angle.

* * * * *